Feb. 12, 1952     H. A. QUIST     2,585,680
LIQUID LEVEL GAUGE FOR PRESSURE TANKS
Filed Oct. 28, 1947     2 SHEETS—SHEET 1

INVENTOR.
HAROLD A. QUIST
BY Busser and Harding
ATTORNEYS

Feb. 12, 1952 — H. A. QUIST — 2,585,680
LIQUID LEVEL GAUGE FOR PRESSURE TANKS
Filed Oct. 28, 1947 — 2 SHEETS—SHEET 2
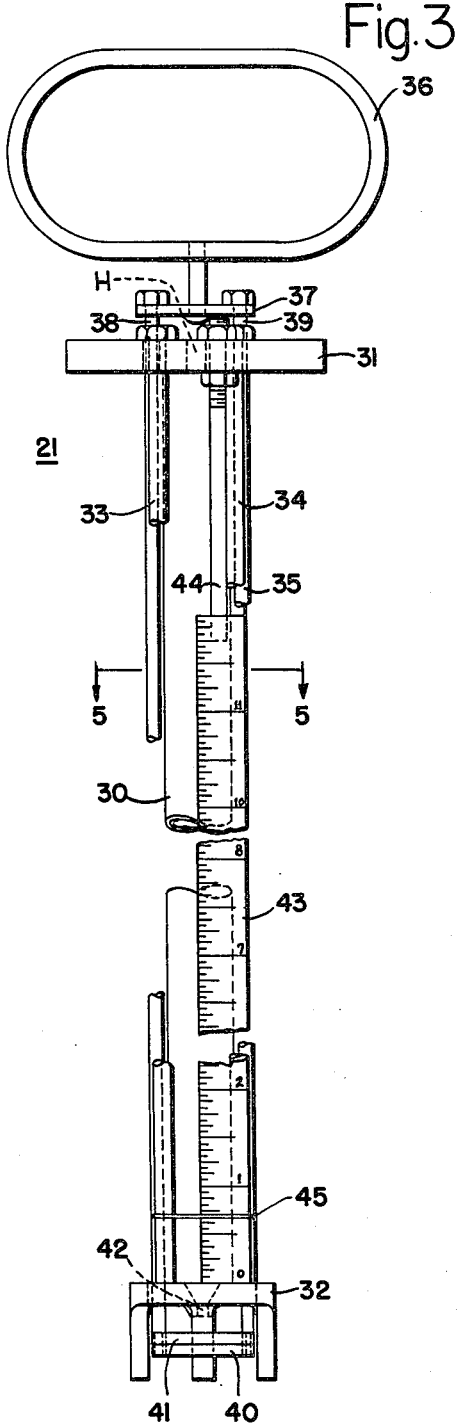
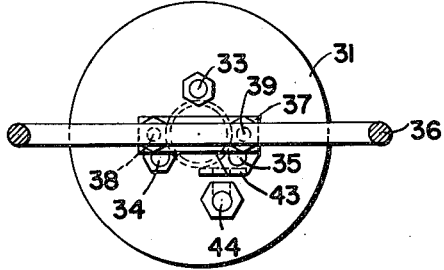
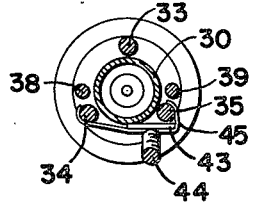
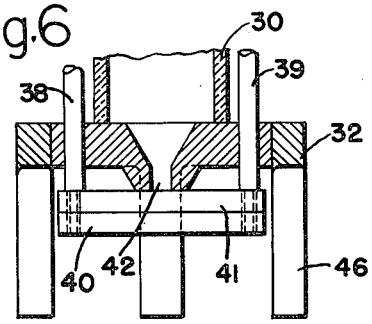
INVENTOR.
HAROLD A. QUIST
BY
ATTORNEYS Patented Feb. 12, 1952

2,585,680

UNITED STATES PATENT OFFICE 2,585,680

LIQUID LEVEL GAUGE FOR PRESSURE TANKS

Harold A. Quist, Elkton, Md., assignor to Sun Oil Company, Philadelphia, Pa., a corporation of New Jersey Application October 28, 1947, Serial No. 782,533

8 Claims. (Cl. 73—290)

1

This invention relates generally to gauges for the amount of liquid in storage tanks, and more particularly to apparatus of the above character for use with storage tanks where the interior of the tank must remain sealed with respect to the atmosphere, as, for example, tanks containing volatile petroleum products.

The storage of highly volatile petroleum products which become gaseous at atmospheric pressure and require storage conditions of higher pressure and sealed tanks develop part gas and part liquid content in the storage tanks. Normally, this fluid is in the liquid state in the pressure lines of the refinery and is measured in liquid rather than gaseous volumetric units. It is necessary, therefore, to measure the liquid contents of the storage tanks from time to time under the exact conditions existing within the sealed storage tanks. A reading at any other pressure or temperature will be erroneous.

The present invention has for its general object the disclosure of apparatus capable of measuring the depth, and consequently, the volume of the liquid content of a sealed storage tank for highly volatile liquids under pressure without opening the tank.

Another object is to disclose apparatus for measuring the liquid content of a tank for storage as described where the bulk of the contents are cancelled as a measured quantity and the exact measure of the contents found by the carefully measured volume remaining in excess of the canceled quantity.

Still another object is to disclose apparatus for the internal measurement of the quantity of liquid in a storage tank under pressure where the finally required quantity to determine the exact volume is so reduced in size that the measuring device can be read in a small reading chamber mounted on top of, and open to the internal conditions of, the large storage tank.

Other objects and advantages of the invention will appear from the following description of a preferred embodiment of the invention, as illustrated in the accompanying drawings, in which:

Figure 3 is an elevation of an ullage rod.

Figure 4 is a plan view of the ullage rod.

Figure 5 is a cross section on line 5—5 of Figure 3.

Figure 6 is a partly broken away view of the valve member of the ullage rod.

Figure 1:
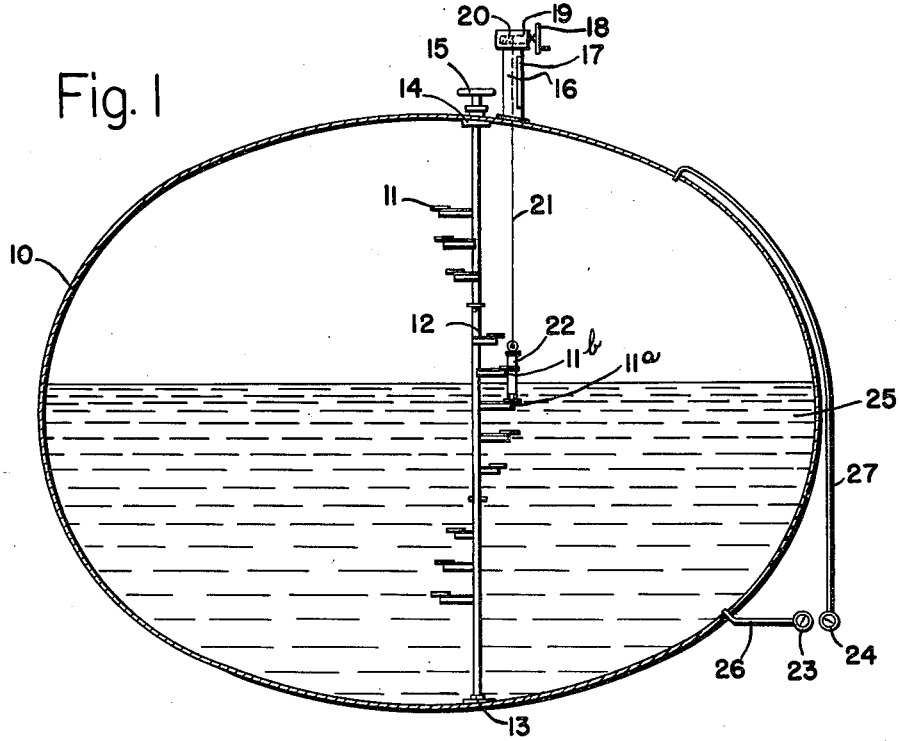
Figure 1 is a sectional view of a high pressure gas tank showing the gauging apparatus.

Referring to Figure 1, tank 10, here shown as elliptoid in cross section but may be of any

2 shape, is adapted to hold a series of platforms 11 mounted or rigidly fixed to a freely rotating vertical member 12 at equally spaced intervals. Bearing 13 positions vertical member 12 in the bottom of tank 10 and a bushing 14, tightly packed to prevent leakage, permits an extension of vertical member 12 to pierce the top of tank 10 where it is terminated by an adjusting wheel or selecting arm 15. Adjacent the platform apparatus is a reading chamber 16, glass faced at 17 to permit visual inspection of measuring devices within the tank, with a hand lever 18 extending through the packing box 19 to rotate reel 20 on which line 21 can be wound in the raising and lowering of ullage rod 22. Bourdon tube pressure gauges 23 and 24 are shown connected to tank 10 in a position sufficiently close to the bottom that they will always be subjected to a liquid pressure from the liquid 25. Bourdon tube gauge 23 is connected to the lower part of tank 10 through tube 26 and bourdon tube gauge 24 is connected to the vapor space in tank 10 by tube 27. Gauges 23 and 24 measure the differential between the liquid pressure and the vapor pressure in tank 10. A single gauge such as that shown by R. G. Bloxsom in Patent No. 1,371,844 could be used to good advantage in substitution for the indicating apparatus described.

Figure 2:
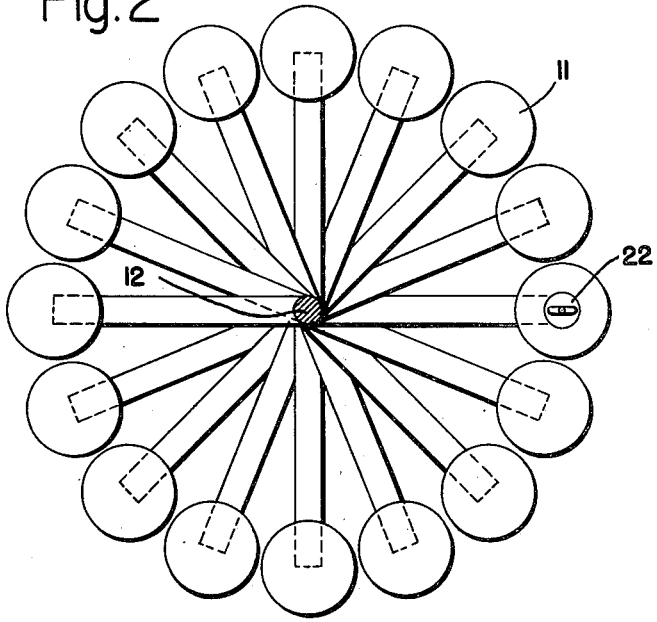
Figure 2 is a plan view of the depth platforms.

Figure 2 illustrates a plan view of the platforms 11 as they radiate from the support member 12. It is necessary that all the platforms be on the circumference of a circle concentric with support member 12. As will be understood in the description of the operation of the device, it is required that each platform be positioned in direct vertical alignment with ullage rod 22. With the radial spacing of the platforms on the circumference of the circle about vertical member 12, as shown, this objective is accomplished.

An ullage rod indicated as number 22 on Figure 1 is shown in partly broken away elevation in Figure 3 and sectional drawings in Figures 4, 5 and 6. This form of ullage rod is particularly well adapted to use with the described device. It is fully described and claimed in application Serial No. 786,911 filed November 19, 1947. The description is given briefly here in order to disclose a complete and operating appliance. Glass tube 30 is mounted between upper cap 31, vented by hole H, and lower cap 32 and retained in place by three rods 33, 34 and 35. A handle 36 is attached to a yoke 37 which is coupled by rods 38 and 39 to valve member 40. The top of valve member 40 is faced with a gasket 41 which forms a seal with the opening 42 when the ullage rod is closed. A scale 43 is mounted on the glass tube 30 and held in position against the glass tube by bent rod 44 and brass wire clips 45. A pedestal 46 is formed as an integral part of lower cap 32 so as to allow valve member 40 to freely open and close on the vertical movement of handle 36 as it rests on a supporting surface.

As disclosed above in this application the purpose of this device is to enable the liquid contents of a high pressure storage tank to be determined under the conditions existing within the tank and without opening the tank to the atmosphere. Preliminary to setting the platforms 11 so that the one of depth just below the surface of the liquid 25 will be in position below ullage rod 22, it is necessary to read the gauges 23 and 24 and determine the difference between them which will indicate the approximate depth of liquid 25. With this information, wheel or selecting arm 15 is rotated so that the platform 11-a, just beneath the surface of liquid 25, is rotated into position to receive ullage rod 22. Reel 20 is unwound permitting ullage rod 22 depending from line 21 to descend and rest on the preselected platform 11-a. The ullage rod coming to rest assumes the open position shown in Figure 3 where the valve member has dropped down and opened passage 42 to the free entrance of liquid 25. After an interval of time ullage rod 22 is lifted from the platform 11-a and the upward pull on handle 36 closes the valve member 40 to assume the position as shown in Figure 6. The ullage rod 22 is lifted into reading chamber 16 and the depth of the liquid is read through reading glass 17.

From this description it will be readily understood that the depth platform 11-a which was selected and rotated into position is set at a predetermined height above the bottom of tank 10 and that the subsequent reading in ullage rod 22 indicates the fraction of the vertical interval between the depth platforms 11-a and 11-b which, when added to the height of platform 11-a, gives the exact depth of the liquid 25 in the tank 10 under the conditions of temperature and pressure as they exist therein without opening the sealed tank. This device enables readings to a very small fraction of an inch to be read accurately.

It will be understood that the device, as described, is particularly well suited for measuring the contents of sealed tanks under pressure, but could be used to measure the contents of any tank with little or no modification.

What I claim and desire to protect by Letters Patent is:

1. A device for measuring the liquid contents of a closed pressure vessel comprising a rod vertically and rotatably mounted in said pressure vessel through the top thereof, a stuffing box closing said tank about the upper end of said rod, a plurality of angularly spaced platforms vertically arranged at predetermined elevations on said rod, a selecting arm attached to the upper end of said rod exterior said pressure vessel, a reading chamber adjacent said rod and vertically aligned with a selected one of said angularly spaced platforms, a liquid sample tube adapted to retain a column of liquid and graduated to indicate the depth of said liquid column, a flexible line attaching said sample tube to said reading chamber and a hand operated reel adapted to raise and lower said liquid sample tube depending from said flexible line.

2. A device for measuring the liquid contents of a closed pressure vessel comprising a rotatable rod vertically mounted in said pressure vessel through the top thereof, a stuffing box closing said tank about the upper end of said rod, a number of angularly spaced platforms vertically arranged at predetermined elevations on said rod, a selecting arm attached to the upper end of said rod exterior said pressure vessel, a reading chamber adjacent said rod and with which any of said angularly spaced platforms are vertically alignable, a liquid sample tube adapted to retain a column of liquid and graduated to indicate the depth of said liquid column, a flexible line attached to said sample tube and extending into and above said reading chamber, a hand operated reel adapted to raise and lower said liquid sample tube depending from said flexible line, and means external of said tank to determine the approximate liquid level therein preliminary to the exact measurement.

3. A device for measuring the liquid contents of a closed pressure vessel comprising pressure measuring means to determine the approximate liquid level externally of the tank; a rotatable rod vertically mounted in said tank and projecting above the top thereof; a number of vertically and horizontally spaced apart platforms concentrically attached to said rod, rotatable therewith and each a known distance above the bottom of said tank; a selecting arm attached to the upper end of said rod exterior the tank graduated to indicate the position of each of the said platforms; a sealed reading chamber on the top of said vessel adjacent the rotatable rod projection and aligned with said spaced platforms; an ullage rod adapted to receive and retain a liquid sample when moved down into contact with a submerged platform aligning therewith; and suspending means cooperating with said reading chamber to raise and lower the ullage rod in relation thereto.

4. A device for measuring the liquid contents of a closed pressure vessel comprising a number of vertically spaced platforms located at predetermined depths relative to the bottom of and the liquid surface in said vessel, means external of said vessel to selectively position said platforms at a reading station, a liquid sample tube adapted to retain and indicate a column of liquid and arranged to engage the selectively positioned platform, a suspending line attached to said sample tube, and a reading chamber mounted on the top of said vessel to enclose said suspending line and receive the sample tube when measuring the liquid depth in said vessel.

5. A device for measuring the depth of the liquid contents in a closed pressure vessel comprising pressure measuring means external of said vessel for initially approximating the liquid depth, a number of vertically and horizontally spaced platforms concentrically arranged about a vertical axis within said vessel and each being at a known height above the bottom of the vessel, means outside the vessel to selectively position at a reading station a submerged platform of a height nearest the approximate determined depth of the liquid, and means to measure the height of the liquid level above said positioned platform.

6. A device for establishing a predetermined exactly measured depth within a body of liquid in a tank for use with ullage rods in determining the contents therein comprising a rotatable rod vertically mounted in the tank and projecting above the top thereof; a number of vertically and horizontally spaced apart platforms concentrically fixed to said rod, rotatable therewith, and each a known distance above the bottom of said tank; and a selecting arm attached to the upper end of said rod exterior the tank and graduated to indicate the position of each of the said platforms.

7. A device for precisely measuring the liquid contents of a closed pressure vessel comprising means to determine the approximate level of liquid in the vessel, a number of vertically and horizontally spaced platforms located within and at different known levels above the bottom of the vessel, an ullage rod movable down into and up above the vessel, means to move said platforms in a horizontal direction to position in vertical alignment with the ullage rod the submerged platform nearest the level of the surface of the liquid, said ullage rod comprising valve means adapted, when the rod is lowered to rest on the platform, to admit liquid thereto to a height corresponding to the depth of liquid above said platform, said height being readable when the ullage rod is lifted above the vessel, such height plus the depth of liquid below said platform measuring the depth of liquid in the vessel.

8. A device for precisely measuring the liquid contents of a closed pressure vessel comprising means to determine the approximate level of liquid in the vessel, a number of vertically and horizontally spaced platforms located within and at different known levels above the bottom of the vessel; an ullage rod having a length not less than the greatest vertical distance between any two adjacent platforms and vertically moveable within the vessel; means to move said platforms in a horizontal direction to position the submerged platform nearest the level of the liquid surface in alignment with the ullage rod, said aligned submerged platform being adapted to arrest the downward movement of the ullage rod when partially submerged to register the height of liquid above said platform; said height being readable when the ullage rod is lifted above the vessel, such height plus the depth of liquid below said platform measuring the precise depth of liquid in the vessel.

HAROLD A. QUIST.

REFERENCES CITED

The following references are of record in the file of this patent:

UNITED STATES PATENTS

| Number | Name | Date |
|---|---|---|
| 1,296,794 | Haggstrom | Mar. 11, 1919 |
| 1,788,265 | Wood | Jan. 6, 1931 |
| 2,226,060 | Johnson | Dec. 24, 1940 |
| 2,382,377 | Blake | Aug. 14, 1945 |

FOREIGN PATENTS

| Number | Country | Date |
|---|---|---|
| 10,729 | Great Britain | July 29, 1884 |